3,205,076
PREPARATION OF MAPLE SIRUP FROM BUDDY SAP

Aaron E. Wasserman, Philadelphia, and Charles O. Willits, Glenside, Pa., assignors to the United States of America as represented by the Secretary of Agriculture
No Drawing. Filed Aug. 29, 1963, Ser. No. 305,557
3 Claims. (Cl. 99—142)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This application is a continuation-in-part of application Serial No. 145,783, filed October 17, 1961, now abandoned.

This invention relates to the preparation of maple sirup. More particularly, this invention relates to processes for preparing a commercially acceptable maple sirup from "buddy" sap and "buddy" sirup.

Under certain conditions maple trees yield a sap which is termed buddy sap. Maple sirup prepared from buddy sap has a disagreeable odor and flavor, and the product is known as buddy maple sirup. Buddy maple sirup cannot meet Federal and State specifications for table sirup and represents an economic loss to the producer. Since buddy sap usually occurs toward the end of the maple sap season, one explanation is that there is a change in composition of the sap related to the physiological changes taking place in the tree as it comes out of dormancy, usually accompanied by noticeable swelling of the leaf buds, hence the term buddy sap. There are no chemical or physical tests for buddy sap and it cannot be detected until the sap is boiled and partially concentrated. There is a characteristic odor which becomes noticeable in the vapor of the boiling sap.

A sugar bush may contain some maple trees that come out of dormancy before the other trees. Since the intensity of the characteristic buddy flavor is so high, the sap from one buddy tree can render worthless all the sirup made from an entire bush. At other times, mild weather conditions in mid-maple season may cause sufficient changes in all the trees to produce only buddy sap. With the advent of paraformaldehyde pellets, sap now runs later in the spring than before and the amount of buddy sap collected will be potentially greater. Any means of salvaging buddy sap, and quantities of sap contaminated with buddy sap, is of great importance to the maple sirup industry.

We have discovered that the selective culture of a particular microorganism in buddy sap provides a sap product from which commercially acceptable maple sirup, free of the buddy off-flavor, can be made. The fate of the material characteristically peculiar to buddy sap has not been established, but whether the precursor to the buddy flavor has been metabolized or otherwise eliminated or inactivated is immaterial to the invention.

Even more surprisingly, we have discovered that the microbial activity applies not only to the precursor material in the sap, but is also operative on the off-flavor constituents which are developed in making the sirup from buddy sap. Upon culturing the microorganism in diluted buddy sirup the buddy off-flavors are eliminated.

According to the present invention buddy sap, or buddy maple sirup diluted with water, is inoculated with a culture of bacteria capable of growth on these maple media with resultant production of good maple-flavored sirup and capable of eliminating the buddy flavor producing substances, the inoculated maple medium is incubated until substantially all the constituents responsible for buddy flavored maple sirup have been acted upon by the propagating culture, and the incubated medium is evaporated to produce a commercially acceptable maple sirup.

The species of microorganism used as the inoculum is important to the success of the new process. While demonstrated only with *Pseudomonas geniculata*, there are undoubtedly other bacteria which are capable of growth on maple sap and which can cause the elimination of buddy flavor substances, with resultant production of good maple-flavored sirup and hence are satisfactory for use in the new process. There are, however, bacteria which impart off-flavors, stringiness, and other deficiencies to maple sirup as a result of growth in normal maple sap, and the products made after culturing these bacteria would be unsatisfactory even if the "buddy" flavor had been eliminated.

In a preferred embodiment of the invention the microbial action is provided by inoculum of a microorganism which enhances the maple flavor and color of the maple sirup product. As especially preferred microorganism for use in the process of this invention is *Pseudomonas geniculata*.

Since the treatment of the buddy sap involves culturing with specific organisms, the sap should be collected with due regard to keeping adventitious microorganisms at a minimum. Current practices in the industry, such as sanitizing tapholes and using sanitary collecting equipment, are such that the invention is considered applicable to most sap as currently collected.

When buddy sap has been evaporated to buddy sirup, the sirup contains 66% sucrose, and it is necessary to dilute the sirup so that the bacteria will grow. In the practice of the invention, sirups were diluted to a solids concentration of about 18–22° Brix, as obtained by combining a sirup and about three volumes of water, although lesser or greater dilutions may be used.

Since some unknown factors of diluted sirup are conductive to the formation of polysaccharide slimes (ropy sap or sirup) under conditions of incubation in the present process, contaminating organisms involved in this undesirable effect are excluded or inactivated. When sirup was heated to boiling for 5 minutes, cooled, diluted, inoculated, and incubated, slime formation did not occur. Alternatively, the diluted sirup was heated to boiling for 5 minutes, cooled, inoculated and incubated with no formation of polysaccharide slime. An important consideration is the use of a clean vessel for the incubation step. In general, there is no problem if typical bacteriological practices to prevent contamination of the media are employed.

The incubation is typically conducted at room temperature, about 22–25° C., although any temperature conducive to the growth of *Pseudomonas geniculata* is satisfactory. At this temperature an incubation time of 18 to 24 hours is sufficient to remove or inactivate the constituents in sap responsible for subsequent development of buddy flavor, while somewhat longer times, usually about 48 hours, may be necessary to remove the unpleasant flavor from buddy sirup. Samples of the solution are removed during incubation and reduced to sirup to test for the presence of the undesirable flavor. With other factors remaining constant, incubations at lower temperatures will require longer times to achieve equivalent results. For example, buddy sap was incubated three days at temperatures just above zero centigrade, at least three times that necessary at room temperature.

The incubated sap or diluted sirup is evaporated to maple sirup by conventional methods to give a commercial grade sirup with characteristic maple flavor.

The following examples are presented to illustrate the practice of the invention, but are not intended to be in limitation thereof.

EXAMPLES 1 TO 7

The sap used in these examples was identified as buddy sap by boiling a small volume of the sap and detecting the strong, characteristic odor associated with buddy sap. This sap had been collected and handled under conditions to minimize microbial contamination. Eight gallons of sap were transferred to each of two 12-gallon carboys in which the sap was to be inoculated and incubated.

The inoculum was prepared as follows: A culture of *Pseudomonas geniculata*, strain 4, was grown in a Brunswick fermentor, with aeration, on a medium containing $MgSO_4$, 0.1%; NaCl, 0.1%; KCl, 0.05%; $KH_2PO_4$, 0.1%; $Na_2HPO_4$, 0.2%; yeast extract, 0.5%; and glucose, 1%; in water. After 24 hours at 22° C. the cells were collected by centrifuging and resuspended in a small quantity of sterile water.

Each of the two carboys of buddy sap was inoculated with a volume of the suspension of *Pseudomonas geniculata* sufficient to give an initial count of $2 \times 10^6$ cells per ml. of sap. Immediately after seeding the buddy sap, two gallons of the inoculated sap was removed from each carboy and evaporated to maple sirup to serve as a zero time control (Examples 1 and 5). One carboy was incubated at room temperature (about 23° C.) and the other placed in a cold room at about 3° C.

Two gallon portions of sap were removed from the carboy incubated at 30 C. after 3 days, after 6 days, and after 9 days (Examples 2 to 4, respectively) and from the carboy incubated at 23° C., after 1 day and 3 days (Examples 6 and 7, respectively). The controls and all incubated portions of sap were reduced to sirup immediately after withdrawal from the carboys using the following conditions selected to similate preparation of sample sirup in a commercial evaporator. The sap was evaporated rapidly (30-35 minutes) in a steam-jacketed kettle to a density of about 45° Brix. The sirup was transferred to a stainless steel beaker equipped with a condenser and refluxed for one hour over a Meeker burner. The refluxed sirup was transferred to a 1-quart steam kettle and evaporated rapidly (5-8 minutes) to standard density sirup (65.5° Brix).

*Table 1*

| Example No. | Time of Incubation, days | Temperature of Incubation, °C. | Percent Invert | Color of Sirups [1] | Flavor of Sirup |
|---|---|---|---|---|---|
| 1 | 0 | Control | <2 | <1 | Buddy. |
| 2 | 3 | 1-3 | >2<4 | <2 | No buddy flabor; some maple. |
| 3 | 6 | 1-3 | >3<5 | >3 | Maple. |
| 4 | 9 | 1-3 | >4<6 | >3 | Maple. |
| 5 | 0 | Control | <2 | <1 | Buddy. |
| 6 | 1 | 23 | >2<4 | >3 | No buddy; some maple. |
| 7 | 3 | 23 | >5<6 | >3 | Maple. |

[1] U.S. Department of Agriculture color standards for maple sirups: 1—light amber; 2—medium amber; 3—dark amber.

The sirups were rated as to flavor, color of sirup and approximate percent of invert sugar. Data pertaining to the examples is summarized in Table 1. The control sirups had an objectionable odor and unpalatable flavor typical of buddy sirup. As shown in Examples 2 and 6, incubation of the buddy sap for 3 days at about 3° C. or for only one day at room temperature resulted in maple sirups with no buddy flavor characteristics and a definite maple flavor. Further incubation of the sap served to intensify the maple flavor in the sirup products

EXAMPLE 8

Sirup having the strong, characteristic buddy flavor was used in the following experiment:

(1) 0.5 gallon of sirup heated to boiling and held 5 minutes, diluted with 1.5 gallon of water.

(2) 0.5 gallon of sirup diluted with 1.5 gallon of water, heated to boiling and held 5 minutes.

(3) 0.5 gallon of sirup diluted with 1.5 gallon of water, not heated.

(4) 0.5 gallon of sirup diluted with 1.5 gallon of water, not heated.

When the heated solutions had cooled, containers #1, 2 and 3 were inoculated with a culture of *Pseudomonas geniculata;* container #4 was kept as control. The inoculated solutions were incubated at room temperature (about 25° C.) for 48 hours. The dilute solutions were concentrated to sirup by a standard procedure.

Sirup #4 was still very buddy. Sirups #1, 2 and 3 had no buddy flavor.

EXAMPLE 9

30 gallons of sirup having the characteristic buddy flavor was heated to boiling and held at about 102° C. for 15 minutes. The sirup was diluted with 90 gallons of cold water to about 20° Brix. When cool, the solution was inoculated with *Pseudomonas geniculata* culture and incubated at room temperature (about 25° C.). After 24 hours the solution was concentrated to standard sirup density. The buddy flavor was removed, leaving a palatable sirup of commercial value.

EXAMPLE 10

180 gallons of buddy maple sirup from another supplier was heated to boiling in a steam-heated maple sirup finishing pan. The hot sirup was continuously added to a tank containing 550 gallons of cold water. The final solution was 21° Brix with respect to total solids. The tank was inoculated with a culture of *Pseudomonas geniculata* and incubated at 26-29° C. After 24 hours the fermented dilute sirup was concentrated to sirup of standard density. The buddy flavor had been removed and the sirup had commercial value.

We claim:

1. A process for the preparation of maple sirup comprising inoculating a maple medium selected from the group consisting of buddy sap and aqueous diluted buddy maple sirup with *Pseudomonas geniculata*, incubating the inoculated maple medium until substantially all the constituents responsible for buddy flavored maple sirup have been acted upon by the propagating culture, and evaporating the incubated medium to produce a commercially acceptable maple sirup.

2. The process of claim 1 in which the maple medium is buddy maple sap.

3. The process of claim 1 in which the maple medium is aqueous diluted buddy maple sirup.

References Cited by the Examiner

UNITED STATES PATENTS 2,880,094  3/59  Naghski et al. _____ 99—142

A. LOUIS MONACELL, *Primary Examiner.*